United States Patent Office 3,590,009
Patented June 29, 1971

3,590,009
HALOMETHYL VINYL GLYCIDYL ETHERS AND POLYMERS THEREOF
Arthur E. Gurgiolo and Robert W. McAda, Lake Jackson, Tex., assignors to The Dow Chemical Company, Midland, Mich.
No Drawing. Filed Nov. 1, 1967, Ser. No. 679,624
Int. Cl. C08g 23/02, 23/06
U.S. Cl. 260—2
8 Claims

ABSTRACT OF THE DISCLOSURE

Our invention comprises:
(1) New compounds of the formulas

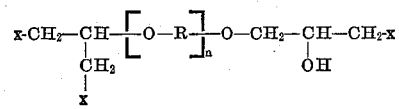

(I)

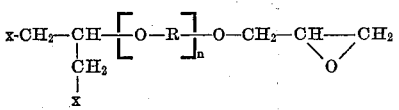

(II)

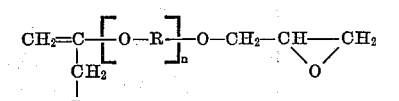

(III)

wherein R is alkylene, haloalkylene, aralkylene or haloaralkylene, $n=0$ to 6, and $x$ is Cl, Br or I;

(2) Their method of preparation which comprises reacting by contacting a glycerine di-halohydrin with 0 to 6 moles of an alkylene oxide and at least 1 mole of an epihalohydrin to produce Formula I and then treating same with a dehydrohalogenating agent to produce Formulas II and III;

(3) The polymers and copolymers of Formulas II and III;

(4) The method of vulcanizing the polymers and copolymers of Formula III.

BACKGROUND OF THE INVENTION

The diethers of this invention, represented by the formulas

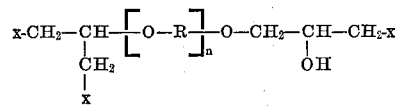

(I)

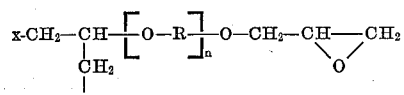

(II)

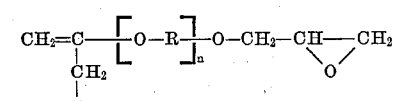

(III)

wherein R is alkylene, haloalkylene, aralkylene or haloaralkylene of from 2 to 4 carbon atoms in the alkylene groups, $n=0$ to 6, and $x$ is Cl, Br or I; are related to, but patentably distinct from, our pending application, Ser. No. 394,301, filed Sept. 3, 1964, which teaches allyloxypolyoxyalkylene glycidyl ethers.

The art of vulcanizing unsaturated polymeric compounds with sulfur and accelerators is well known. Such art is now applied to unsaturated high molecular weight polyethers which are capable of vulcanization. These polyethers are substantially made up of polymerized propylene oxide and small amounts of some other epoxide that contains an unsaturated group within the monomer molecule. When these two epoxides are polymerized together, the resultant polymer is capable of being vulcanized by virtue of the unsaturation contained within.

Other techniques have been devised to achieve "vulcanization," i.e. crosslinking, that eliminate the need for sulfur as the crosslinking agent. It is often desirable to do so because sulfur, although highly effective, also introduces some deleterious properties to the vulcanized rubber. Thus it has often been noted that sulfur-cured rubbers have poorer oil resistance, solvent resistance and heat resistance than do many rubbers that have been cured by other means.

While techniques have been developed to circumvent the use of sulfur, although they are applicable to many of the rubbers now commercially available, they are for the most part inapplicable to propylene oxide rubbers because of their polyether structure. Thus the use of radiation will successfully crosslink polyethylene or ethylenepropylene copolymers as will milling in peroxides with subsequent heating. Both of these are free-radical processes, and in predominantly hydrocarbon polymers the rate of crosslinking exceeds the rate of chain scission with the result that crosslinked or "vulcanized" polymers result. With polyethers, however, the rate of chain scission generally exceeds the rate of crosslinking so that degradation results and the polymers have poorer physical properties as a result of the treatment.

Another technique for crosslinking polymers utilizes the reactivity of functional groups that may be present in the polymer so that the polymer chains are connected together via a difunctional agent which is added and reacts with the reactive groups present in the polymer. Thus if pendant chlorine groups are present in the polymer it may be reacted with a diamine such as ethylene diamine or other compounds that contain at least two reactive amine sites, and as a result of such a reaction, the polymer is then crosslinked or vulcanized through the amine groups. Alternatively, ammonia may be used to effect crosslinking since it is trifunctional and is capable of reacting with three chlorine groups. Ammonia is usually generated "in situ" by milling into the functional polymer some compound that will produce ammonia upon heating the mixture. Such compounds may be ammonium benzoate or other ammonium salts. These techniques have been used with polyepichlorohydrin, a polyether containing a chloromethyl side chain, and made by the polymerization of epichlorohydrin. However, disadvantages likewise appear in this system because the chlorine groups are primary-chlorines and are rather sluggish in reactivity. As a result, it requires a fairly reactive amine compound to successfully crosslink such a polymer. The ability to control the reaction is poor because the amine is capable of reacting prematurely with the polymer resulting in "scorching" or crosslinking before the polymer can be completely milled or shaped into a desired form. Further, the resultant polymer tends to yellow or discolor on heating, and unless carbon black is present to obscure the color, it is difficult to obtain good light-colored articles. Ammonium benzoate is sufficiently unreactive with these unreactive chlorine groups, so that it is difficult to get good "cures" or crosslinking except with prolonged heating times.

Another method of crosslinking a chlorinated polymer is utilized in the vulcanization of "Neoprene" or polychloroprene (poly-2-chloro-1,3-butadiene). In this technique, a combination of 5 parts of zinc oxide and 4 parts of magnesium oxide is most commonly used as a vulcanizing agent. Often an accelerator such as 2-mercaptoimidazoline or a trialkyl thiourea derivative sold by R. T. Vanderbilt Co., Inc. under the trademark Thiate B.

and an antioxidant such as phenyl-beta-naphthylamine is added to assist in the vulcanization and stabilization of the polymer. ("Chemistry of Natural and Synthetic Rubbers," Harry L. Fisher, Reinhold Pub. Co., 1967, pp. 99 and 100.) Such systems are ineffective in the vulcanization of polyepichlorohydrin because of the unreactivity of the halogen.

SUMMARY OF THE INVENTION

We have discovered that a polyether capable of being vulcanized by zinc and magnesium oxides alone, thusly avoiding the deleterious properties of sulfur, can be made by incorporating into the polymerizing mixture a monomeric epoxide that contains an allylic halide group within its structure. This invention relates to these compounds, their preparation, the polymers and copolymers thereof and the vulcanization of a group of these polymers.

The first compound of our invention, represented by Formula I above, is prepared by reacting by contacting a glycerine di-halohydrin with an alkylene oxide and then an epihalohydrin, in the presence of a Lewis acid catalyst.

The second compound of our invention, represented by Formula II, as defined above, is prepared by adding a dehydrohalogenating agent to the compound of Formula I.

The third compound of our invention, represented by Formula III, as defined above, is prepared by adding a dehydrohalogenating agent to the compound of Formula II.

Formula I is useful as an intermediate for Formulas II and III, and Formulas II and III are useful in the preparation of copolymers and homopolymers, some of which can be vulcanized without the use of sulfur. These monomers can be copolymerized with alkylene oxides such as ethylene oxide, propylene oxide, butylene oxide, styrene oxide and epihalohydrins such as epichlorohydrin and epibromohydrin. They can also be polymerized with allyl glycidyl ethers and allyl oxyalkyl glycidyl ethers such as those taught in our pending application, Ser. No. 394,301.

More particularly, the compound of Formula I, as described above, can be prepared by reacting by contacting a glycerine di-halohydrin with 0 to 6 moles of an alkylene oxide, such as ethylene oxide, propylene oxide, butylene oxide and styrene oxide, and then with at least 1 mole of an epihalohydrin, such as epichlorohydrin, epibromohydrin, and epiiodohydrin, in the presence of a Lewis acid catalyst, such as $BF_3$-etherate, HF, $SnCl_4$, $BF_3$-gas and $H_2SO_4$. The reaction normally occurs at a temperature of from about 20° to about 100° C. and preferably from about 25° C. to 40° C. at atmospheric or autogenous pressure. The reaction should be allowed to continue until all, or substantially all, the products have reacted.

A preferred method for the production of the compound of Formula II, as described above, is by contacting the compound of Formula I with at least an equimolar amount of a suitable dehydrohalogenating agent, such as the alkali metal hydroxides and carbonates, for example KOH, NaOH, $Na_2CO_3$, $BaCO_3$, etc. This reaction is performed at a temperature of from about 25° to about 100° C. and preferably from about 50° to 70° C.

The preferred method for the preparation of the compound of Formula III, as described above, comprises reacting by contacting the compound of Formula II with at least an equimolar amount of the dehydrohalogenating agent at a temperature of from about 50° to about 120° C. and preferably from about 80° to 110° C.

If desired, the compound of Formula III can be produced directly from Formula I by adding to Formula I at least 2 molar equivalents of the dehydrohalogenating agent for each mole of glycerine di-halohydrin originally employed in the production of Formula I, suitably at a temperature of from about 50° to about 120° C. and preferably from about 55° to 65° C. Vigorous agitation is desirable, such as is provided by a high-speed, high-shear stirrer.

The polymerization and copolymerization of Formulas II and III can be effected with the use of the catalysts that polymerize alkylene oxides, such as metal alkyls, for example, diethyl zinc, triethyl aluminum or partly hydrolyzed and/or chelated complexes thereof; iron catalysts, for example ferric halides such as ferric chloride, ferric carboxylates such as ferric acetate; ferric alkoxides, for example ferric ethylate and ferric isopropylate and partly hydrolyzed ferric alkoxides such as those taught in U.S. Pat. No. 2,873,258; alkalies; and Friedel-Crafts catalysts. The polymerization reaction should occur at a temperature of from about 25° to about 100° C. and preferably from about 60° to 90° C. Pressure is not critical and is suitably atmospheric or the autogenous pressure.

Vulcanization of the polymers and copolymers of Formula III, as defined above, is achieved by a milling-curing process.

The milling process utilizes reinforcing agents such as the following carbon-blacks; semi-reinforcing furnace, general purpose furnace, high modulus furnace, high abrasion furnace, intermediate super-abrasion furnace and super-abrasion furnace. Also utilized are non-black agents such as silicon dioxide, magnesium silicate, hydrated aluminum silicate or hard clay. For carbon-filled elastomers, based on 100 parts of raw rubber, 20 to 70 parts of the carbon blacks mentioned above may be utilized, depending upon the physical properties desired. The most frequently used ratio is 50 parts. For white or colored elastomers, non-black agents are used instead of carbon blacks, in the same ratios as above.

Also milled into the rubber are anti-oxidants such as phenyl-beta-naphthylamine, mixtures of alkylated diphenylamines, sym.-di-beta-naphthyl - para - phenylenediamine, polymerized 1,2-dihydro-2,2,4-trimethylquinoline, and other well known antioxidants. Based upon 100 parts raw rubber, 0.5 to 5 parts antioxidant may be used, and 2 parts is preferred.

The above milling process utilizes well known lubricating agents, such as stearic acid.

During milling, the vulcanization agents, such as ZnO, MgO, $Pb_3O_4$ or PbO, are blended in, along with curing accelerators such as 2-mercaptoimidazoline; Thiate A (a proprietary thiohydropyrimidine), Thiate B (a proprietary trialkyl thiourea), or Thiate E (a propietary trimethyl thiourea), all trademarks of the R. T. Vanderbilt Co., Inc.

The vulcanization agent is preferably a mixture of MgO and ZnO with an optimum ratio of 4 parts MgO and 5 parts ZnO per 100 parts raw rubber. However, all MgO or all ZnO may be used, or any combination thereof, varying from 5 parts to 20 parts total oxide. It is to be noted that the latter ratios affect the cure rate and physical properies of the vulcanized elastomer. $Pb_3O_4$ or PbO may be similarly used.

The cure rate is affected by the above accelerator and these may be added in an amount of 1 to 2 parts per 100 parts raw rubber, but they are most effective if added at a rate of from 1 to 3 parts accelerator per 10 parts metal oxide vulcanization agent.

The polymers and copolymers of the instant invention are best cured at temperatures of from about 280° to 340° F. and preferably from about 290° to 320° F., at a pressure of from about 500 p.s.i. to 3500 p.s.i. and preferably from about 2000 p.s.i. to 2500 p.s.i. for a time of about 20 to 60 minutes, and preferably from 30 to 60 minutes.

SPECIFIC EMBODIMENTS

The following examples are offered as specific embodiments of our invention, but they are in no way intended to limit same:

Example I.—1-(1,3-dichloroisopropoxy)-3-chloro-2-propanol

In a one liter flask equipped with a stirrer, thermometer, condenser and separatory funnel, was placed 129 grams (one mole) of glycerine dichlorohydrin and one ml. (milliliter) of BF$_3$-etherate catalyst. From the funnel was added 92.5 grams (one mole) of epichlorohydrin, over a period of one hour, followed by a one hour digestion period. After removing volatiles under reduced pressure, there was recovered 229 grams of product.

1-(1,3 - dichloroisopropoxy)-3-chloro-2-propanol was found to have a boiling point of 91° to 92° C. at 0.15 mm. (millimeter) pressure.

Example II.—1-(1,3-dichloroisopropoxy)-2,3-epoxypropane

Into a one liter pot equipped with a stirrer, thermometer and condenser, was placed 600 grams (2.71 moles) of 1-(1,3-dichloroisopropoxy)-3-chloro-2-propanol. This was heated to 65° C. and solid potassium hydroxide flakes were added, 2.71 moles in three increments of 50 grams each (total 150 grams). The exotherm was mild and easily controlled by blowing air on the outside of the flask as needed to hold a temperature of 65° to 70° C. When the exotherm from each portion was over the next portion was added. The mixture was digested 30 minutes. After cooling, it was filtered free of salt then distilled. The distillate was a clear colorless liquid weighing 455 grams. 1-(1,3-dichloroisopropoxy)-2,3-epoxypropane was found to have a boiling point of 69° to 71° C. at 0.15 mm. pressure.

Example III.—1-[2-(1,3-dichloroisopropoxy)-1-chloromethylethoxy]-3-chloro-2-propanol In a five liter, five-necked flask equipped with a stirrer, thermometer, condenser and separatory funnel was placed 3200 grams (25.5 moles) of glycerine dichlorohydrin and 3 ml. of BF$_3$-etherate catalyst. From the funnel was fed 925 grams (10 moles) of epichlorohydrin over a period of 5½ hours in order to hold the reaction temperature between 55° and 60° C. The reaction was then digested overnight at room temperature. The excess glycerine dichlorohydrin was first removed under reduced pressure, then the reaction product distilled. There was incidentally recovered 795 grams of the same product as recovered in Example I, and 430 grams of 1-[2-(1,3-dichlorosipropoxy)-1-chloromethylethoxy] - 3 - chloro-2-propanol, which had a boiling point of 167° to 170° C. at 0.05 mm. pressure.

Example IV.—1-chloromethylvinyl glycidyl ether

To a one liter flask equipped with a stirrer, thermometer and condenser, was added 580 grams of 1-(1,3-dichloroisopropoxy)-2,3-epoxy propane (3.13 moles). This was heated to 95° C. and a total of 4.13 moles of potassium hydroxide (230 grams), a one mole excess to insure complete reaction, was added in small portions so that the exotherm would hold a temperature of from 95° to 103° C. The mixture was then digested at 100° to 105° C. for one hour, and filtered. 450 grams of crude product was recovered and distilled to yield 285 grams of 1-chloromethylvinyl glycidyl ether, which had a boiling point of 64° to 66° C. at 2.0 mm. pressure.

Example V.—1-[2-(1-chloromethylvinyloxy)-1-chloromethylethoxy]-2,3-epoxypropane

Into a Waring Blendor was put 300 grams (0.955 mole) of 1-[2-(1,3-dichloroisopropoxy)-1-chloromethylethoxy]-3-chloro-2-propanol. To this was added, with high-speed stirring and agitation, 116 grams (2.07 moles) of flaked potassium hydroxide in portions so as to hold the exotherm at 55° C. to 60° C. After adding all the potassium hydroxide, the mixture was digested one hour at 55° to 60° C. The mixture was extracted with 500 ml. of cold water to remove excess potassium hydroxide and potassium chloride. The product was separated by decanting water, and rewashed. Residual water was removed under reduced pressure, the product distilled, and found to have a boiling point of 88° to 91° C. at 0.05 mm. pressure.

Example VI.—Copolymerization of 1-(1,3-dichloroisopropoxy)-2,3-epoxypropane

A citrate bottle was charged with 138 grams of hexane, 83.7 grams of propylene oxide, 8.3 grams of the product of Example I, 0.75 gram of pentanedione, and 0.12 gram of water. The hexane and propylene oxide was found by Karl-Fisher water analysis to have 253 p.p.m. (parts per million) water, which was taken into account in preparing the catalyst mixture. Also added was 6.0 grams of 20% aluminum triethyl in hexane and 0.4 gram Ionol (2,6-ditertiarybutyl-p-cresol). After mixing in the catalyst components, the bottle was allowed to stand one hour, and then capped and put into a 60° water bath for 52 hours. On removal, a white milky gel of polymer and hexane resulted. Upon removing the hexane under reduced pressure, 94 grams of very tough slightly yellowish-greenish translucent polymer resulted (a 100% yield).

Example VII.—Homopolymerization of 1-chloromethylvinyl glycidyl ether

Into a citrate bottle was charged 20 grams of 1-chloromethylvinyl glycidyl ether, 50 grams of hexane, 0.15 gram of pentanedione, and 0.03 gram of H$_2$O. The reactants were mixed, and then 1.4 grams of 20% of aluminum triethyl in hexane was added. The bottle was sealed, and put in an 80° C. water bath for 68 hours. A cream-colored rubbery polymer resulted. It was washed in methanol to remove the monomer and then dried. The dried rubbery polymer weighed 11 grams, or a 55% conversion.

Example VIII.—Copolymerization of 1-chloromethylvinyl glycidyl ether

Into a citrate bottle was charged 138 grams of hexane, 87.4 grams of propylene oxide and 5.2 grams of 1-chloromethylvinyl glycidyl ether. There was added a mixture of 0.75 gram acetylacetone, 0.1 gram of water, 6.0 grams of 20% aluminum triethyl and hexane. After mixing in the catalyst components, the bottle was allowed to stand at room temperature for two hours. Then it was capped and put in a 60° C. water bath for 68 hours.

On removal, a clear solid gel-like polymer and hexane resulted. On removing the hexane under reduced pressure, 94 grams of very tough, rubbery solid polymer resulted (100% yield).

Example IX.—Copolymerization of 1-chloromethylvinyl glycidyl ether

Into a citrate bottle was charged 138 grams of hexane, 83.7 grams of propylene oxide and 8.3 grams of 1-chloromethylvinyl glycidyl ether. There was added a mixture of 0.75 gram pentanedione, 0.12 gram of water, 6.0 grams of 20% aluminum triethyl and hexane, and 0.4 gram of Ionol (2,6-ditertiarybutyl-p-cresol). After mixing in the catalyst components, the bottle was allowed to stand at room temperature for one hour. Then it was capped and put in a 60° C. water bath for 52 hours.

On removal, a slightly cloudy gelled polymer and hexane resulted. On removing the hexane under reduced pressure, 94 grams of very tough, rubbery, light-colored yellowish, translucent polymer resulted (100% yield).

Example X.—Copolymerization of the epoxide of Example V

In a citrate bottle was put 100 grams of hexane, 68 grams of propylene oxide, and 12 grams of 1-[2-(1-chloromethylvinyloxy)-1-chloromethylethoxy]-2,3-epoxy propane. The same amount of the aluminum triethylpentanedione-water catalyst was used as in Example IX above, and polymerization was run for 68 hours at 80° C. There was recovered 80 grams (100% yield) of tough, rubbery, light-greenish polymer.

Example XI.—Vulcanization of the copolymer of Example VIII 100 parts of the above copolymer, 35 parts of Intermediate Super Abrasion Black (carbon-black), 2 parts phenyl-beta-naphthylamine (antioxidant) and 0.5 part stearic acid were blended together on a mill for 15 minutes. Then 4 parts magnesium oxide and 5 parts zinc oxide were blended into the mixture. This was followed by 1 part trialkylthiourea (accelerator).

30 grams of the above compounded batch were then pressed into a 4 by 5 by 0.065 inch metal mold in a heated press at 320° F. and 30,000 pounds ram force for 30 minutes. The product cured to a very tough, rubbery elastic. Dumbbells were cut in a standard fashion and a tensile determination was made on the strips. The vulcanized rubber had an ultimate tensile strength of 1860 pounds per square inch, with a 300% modulus of 940 pounds per square inch with a percent elongation of 585%.

The same polymer was milled similarly except the zinc oxide, magnesium oxide and trialkylthiourea were omitted. After vulcanization for 30 minutes at 320° F., the product had a tensile strength of 200 pounds per square inch, a percent elongation of 275% and 300% modulus of 215 pounds per square inch.

Example XII.—Vulcanization of the copolymer of Example IX

The same vulcanization recipe as taught in the first part of Example XI was employed here. After the vulcanized rubber was removed from the metal mold, it was found that the tensile strength was 1045 pounds per square inch with an ultimate elongation of 325%. The 300% modulus was 900 pounds per square inch, and the rubber demonstrated a Shore Hardness A of 64.

Example XIII.—Attempted vulcanization of the copolymer of Example VI

To demonstrate that the chlorine of 1-(1,3-dichloroisopropoxy)-2,3-epoxypropane cannot be vulcanized with zinc oxide-magnesium oxide, the copolymer of said compound with propylene oxide as taught in Example VI, was vulcanized according to the recipe of Example XI. After pressing and curing for 30 minutes, the product was still putty-like in character with no strength at all. No cure had occurred, showing that the chlorine atoms in this compound are not reactive enough to undergo crosslinking with zinc oxide and magnesium oxide.

Example XIV.—Vulcanization of the copolymer of Example X

The copolymer of Example X was vulcanized according to the recipe of Example XI. The vulcanized rubber had a tensile strength of 1225 pounds per square inch, with a percent elongation of 230%.

We claim:
1. A homopolymer of a compound of one of the formulas

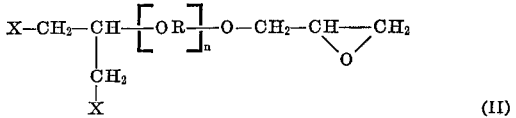

(II)

and

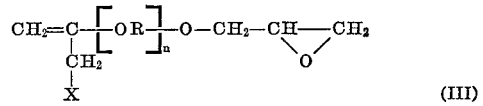

(III)

wherein R is alkylene, haloalkylene, aralkylene or haloaralkylene of from 2 to 4 carbon atoms in the alkylene groups, $n=0$ or 1, and X is Cl, Br or I, the homopolymer being formed by the polymerization of the monomers through the epoxide moiety.

2. The homopolymer of claim 1 wherein the monomer is Formula II.

3. The homopolymer of claim 1 wherein the monomer is Formula III.

4. A copolymer of a compound of one of the Formulas II and III in claim 1, with a monomer selected from the group alkylene oxides, epihalohydrins, allyl glycidyl ethers and allyl oxyalkyl glycidyl ethers, the copolmer being formed by the polymerization of the monomers through the epoxide moiety.

5. The copolymer of claim 4 wherein the monomer is propylene oxide.

6. The copolymer of claim 4 wherein the monomer is epichlorohydrin.

7. The copolymer of claim 4 wherein the compound of Formula II is utilized.

8. The copolymer of claim 4 wherein the compound of Formula III is utilized.

References Cited

UNITED STATES PATENTS

| | | | |
|---|---|---|---|
| 2,949,474 | 8/1960 | Murdoch | 260—348 |
| 3,058,922 | 10/1962 | Vandenberg | 260—2 |
| 3,268,561 | 8/1966 | Peppel et al. | 260—348 |
| 3,419,621 | 12/1968 | Davis et al. | 260—615 |

WILLIAM H. SHORT, Primary Examiner

E. A. NIELSEN, Assistant Examiner

U.S. Cl. X.R.

260—88.3, 348